US012703607B2

(12) United States Patent
Yuksel et al.

(10) Patent No.: US 12,703,607 B2
(45) Date of Patent: Aug. 11, 2026

(54) HANDRAIL SYSTEMS FOR MOVING WALKWAYS

(71) Applicant: Beltways Inc., Cincinnati, OH (US)

(72) Inventors: Edip Yuksel, Cincinnati, OH (US); Matine Yuksel, Cincinnati, OH (US); Yahya John Yuksel, Cincinnati, OH (US); Richard Hoyle, Clarkston, MI (US)

(73) Assignee: Beltways Inc., Cincinnati, OH (US)

( * ) Notice: Subject to any disclaimer, the term of this patent is extended or adjusted under 35 U.S.C. 154(b) by 118 days.

(21) Appl. No.: 18/615,419

(22) Filed: Mar. 25, 2024

(65) Prior Publication Data

US 2024/0343526 A1 Oct. 17, 2024

Related U.S. Application Data

(60) Provisional application No. 63/454,754, filed on Mar. 27, 2023, provisional application No. 63/454,335, filed on Mar. 24, 2023.

(51) Int. Cl.

*B66B 23/24* (2006.01)
*B66B 21/10* (2006.01)
*B66B 23/04* (2006.01)
*B66B 25/00* (2006.01)

(52) U.S. Cl.

CPC .............. *B66B 23/24* (2013.01); *B66B 21/10* (2013.01); *B66B 23/04* (2013.01); *B66B 25/00* (2013.01)

(58) Field of Classification Search

None

See application file for complete search history.

(56) References Cited

U.S. PATENT DOCUMENTS 3,314,517 A * 4/1967 Karr ........................ B66B 21/10 198/321
3,688,889 A * 9/1972 Koch ...................... B66B 23/24 198/337
3,714,902 A * 2/1973 Zuppiger ................ B66B 23/26 198/337
4,232,776 A * 11/1980 Dean ....................... B66B 23/26 198/791
6,602,331 B2 * 8/2003 Gonzalez Alemany ..................... B66B 23/26 96/66

(Continued)

FOREIGN PATENT DOCUMENTS

JP 4407227 B2 * 2/2010

*Primary Examiner* — Gene O Crawford
*Assistant Examiner* — Muhammad Awais
(74) *Attorney, Agent, or Firm* — Hall Estill Law Firm

(57) ABSTRACT

A handrail system for a moving walkway. The handrail includes multiple handgrasp apparatuses for a moving walkway wherein each handgrasp apparatus includes a handgrasp. The handrail system also includes a propulsion system for propelling the handgrasp apparatuses on a passenger side and a return side of a loop track the handgrasp apparatuses travel around. The handrail system further includes a side housing for supporting the handrail system and enclosing the return side for the handgrasps. Another handrail system for use with a moving walkway. This handrail system includes a handrail belt and a driver roller for moving the handrail belt. This handrail system also includes multiple handgrasps driven around a loop track by the handrail belt.

20 Claims, 14 Drawing Sheets

(56) References Cited

U.S. PATENT DOCUMENTS

| | | | | |
|---|---|---|---|---|
| 7,600,628 | B2 * | 10/2009 | Gonzalez Alemany | B66B 23/04 198/334 |
| 11,066,278 | B2 * | 7/2021 | Michalke | B66B 23/10 |
| 2005/0217970 | A1 * | 10/2005 | Gonzalez Alemany | B66B 23/04 198/334 |
| 2010/0089718 | A1 * | 4/2010 | Gonzalez Alemany | B66B 23/04 198/334 |
| 2016/0176681 | A1 * | 6/2016 | Makovec | B66B 21/10 198/321 |
| 2020/0095097 | A1 * | 3/2020 | Yuksel | B66B 21/025 |
| 2021/0039502 | A1 * | 2/2021 | Clark | B60L 13/03 |

* cited by examiner

HANDRAIL SYSTEMS FOR MOVING WALKWAYS

CROSS-REFERENCE TO RELATED APPLICATIONS

The present application is a conversion of U.S. Provisional Application having U.S. Ser. No. 63/454,335, filed Mar. 24, 2023, and U.S. Provisional Application having U.S. Ser. No. 63/454,754, filed Mar. 27, 2023, which claim the benefit under 35 U.S.C. 119 (e). The disclosures of which are hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to handrail systems for use with a moving walkway.

2. Description of the Related Art

Typically, moving walkways have a handrail that is essentially like a giant belt that is driven by the same motor that turns the belt or platform a person stands on when they are on the moving walkway. This is particularly problematic when it comes to the use of modular moving walkways, which do not provide individual handgrasps to the passengers. This type of a handrail can cause a situation where the passenger would have to take their hand off of one handrail and reposition their hand on another handrail for another module of the modular moving walkway.

Accordingly, there is a need for handrail systems that are not connected to or driven by the same mechanism that drives the belt of the moving walkway and provides a continuous handgrasp for a moving walkway made up of separate modules.

SUMMARY OF THE DISCLOSURE

The present disclosure is directed to a handrail system for a moving walkway. The handrail includes multiple handgrasp apparatuses for a moving walkway wherein each handgrasp apparatus includes a handgrasp. The handrail system also includes a propulsion system for propelling the handgrasp apparatuses on a passenger side and a return side of a loop track the handgrasp apparatuses travel around. The handrail system further includes a side housing for supporting the handrail system and enclosing the return side for the handgrasps.

The present disclosure is also directed to another embodiment of a handrail system for use with a moving walkway. The handrail system includes a handrail belt and a driver roller for moving the handrail belt. This handrail system also includes multiple handgrasps driven around a loop track by the handrail belt.

DETAILED DESCRIPTION OF THE DISCLOSURE

Figure 1A:
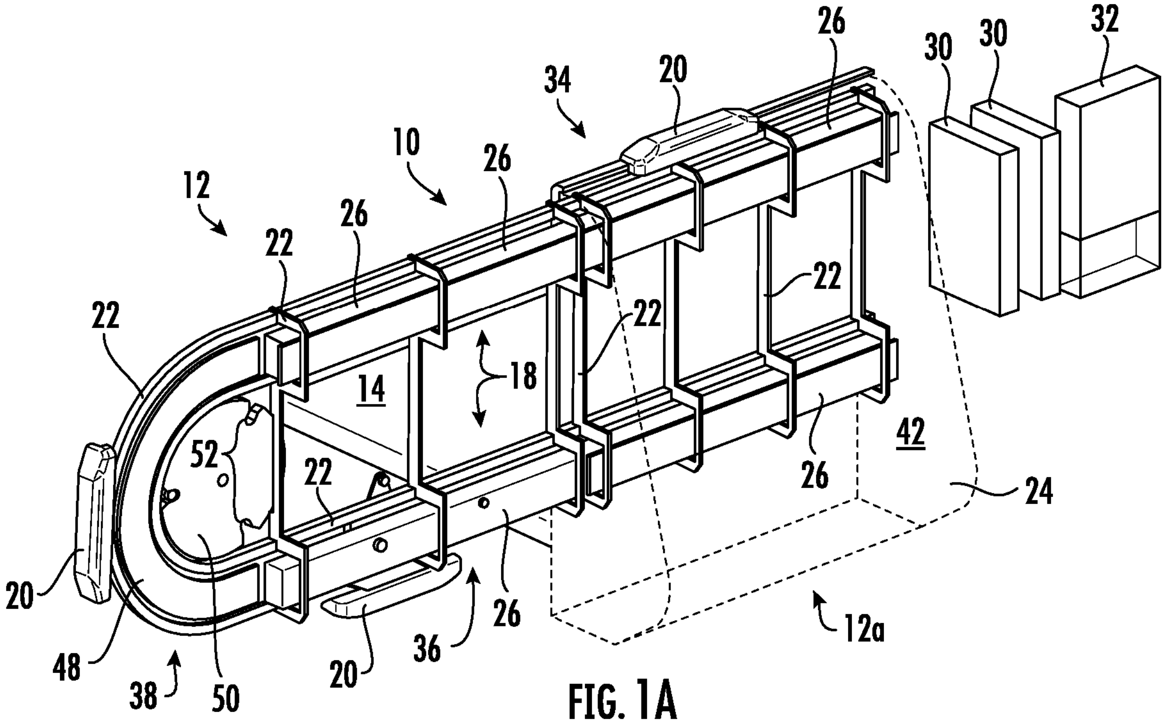
FIGS. 1A and 1B are perspective views of one embodiment of a handrail system constructed in accordance with the present disclosure.
Figure 1B:
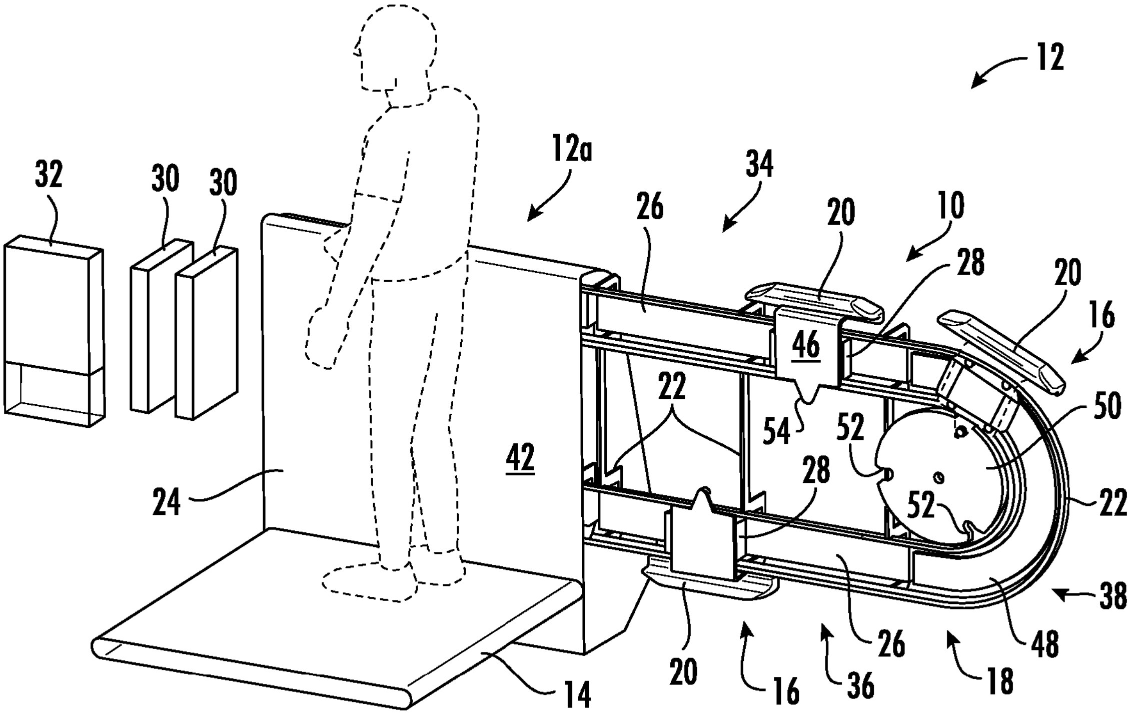

Referring now to FIGS. 1A and 1B, the present disclosure relates to handrail systems 10 that can be used with a moving walkway 12 or a modular moving walkway 12. The present disclosure is also directed to a method of installing, operating and monitoring the handrail system 10 as described herein. The moving walkway 12 can be an accelerating walkway that includes a moving base treadway 14 that can be a belt-type, pallet-type or other accelerating treadway mechanism. The handrail systems 10 can be designed to be synchronized with the speed of the moving base treadway 14, or to have substantially the same speed as the moving base treadway 14 of the moving walkway 12 or have substantially the same speed as each moving base treadway 14 of each module 12*a* of a modular moving walkway 12. In one embodiment, the handrail system 10 includes a handgrasp apparatus 16, a propulsion system 18 for driving the handgrasps 20 of the handgrasp apparatuses 16 and a frame 22 for supporting the propulsion system 18 and the handgrasp apparatuses 16. The frame 22, parts of the handgrasp apparatuses 16 and the propulsion system 18 can be contained in a side housing 24 of the moving walkway 12. It should be understood and appreciated that each moving walkway 12, or each moving walkway module, can include two handrail systems 10 and two side housings 24. It should also be understood and appreciated that each handrail system 10 described herein can be used on each side of the moving walkway 12.

The propulsion system 18 includes a linear motor 26 that defines at least a part of a path the handgrasps 20 will travel and a permanent magnet 28 associated with each handgrasp 20 of each handgrasp apparatus 16. The number of linear motors 26 depends upon the setup of the moving walkway 12, or how many modules there are for a modular moving walkway. Each module 12*a* of a modular moving walkway 12 could have multiple linear motors 26 and the modules 12*a* can be positioned such that the modular moving walkway 12 is practically continuous and movement of the handgrasps 20 is smooth and continuous. The linear motor 26 and the permanent magnet 28 cooperate to propel the handgrasp 20 around the path defined by the layout of the linear motors 26. The linear motor 26 includes charged coils (not shown) disposed therein. The linear motor 26 could also include embedded sensors (e.g., hall effect sensors). The linear motors 26 can be operated by motor drives 30, such as an inverter, which receives commands from a control system 32. The control system 32 includes any necessary computing hardware and software to accomplish the desired function of the handrail systems 10. For example, the computer system 32 can include a controller (PLC), memory, graphical user interface (GUI), a communication interface, and any other hardware or software known to those of ordinary skill in the art. The control system 32 can be used to set motion profiles for each handgrasp 20 by communicating with the linear motor 26, or linear motors 26, included in the propulsion system 18. The control system 32 can coordinate electrical or electromagnetic impulses to each linear motor 26 along the path. The control system 32, via the impulses sent to the linear motor(s) 26, can modulate the speed of each handgrasp 20 for acceleration, constant speed, deceleration, safety stops, and/or other movement patterns.

The handrail system 10 can have a passenger side 34 (top side) where the handgrasps 20 are available to the passengers to engage with and a return side 36 where the handgrasps 20 pass through the side housing 24 before transitioning back to the passenger side 34. The handrail system 10 can also include transition zones 38 disposed at least partially in the side housing 24 where the handgrasps 20 move from passenger side 34 to the return side 36 and from the return side 36 to the passenger side 34. The side housing 24 can include an inner part 40 (the side adjacent to the moving base treadway 14) and an outer part 42. A slot 44 can be created between the inner part 40 and the outer part 42 of the side housing 24 to permit a base member 46 of the handgrasp apparatus 16 to pass therethrough as the handgrasp 20 travels on the passenger side 34 of the handrail system 10. The inside part 40 and the outside part 42 of the side housing 24 can be set up such that the slot 44 is vertically, diagonally or horizontally disposed.

Figure 2A:
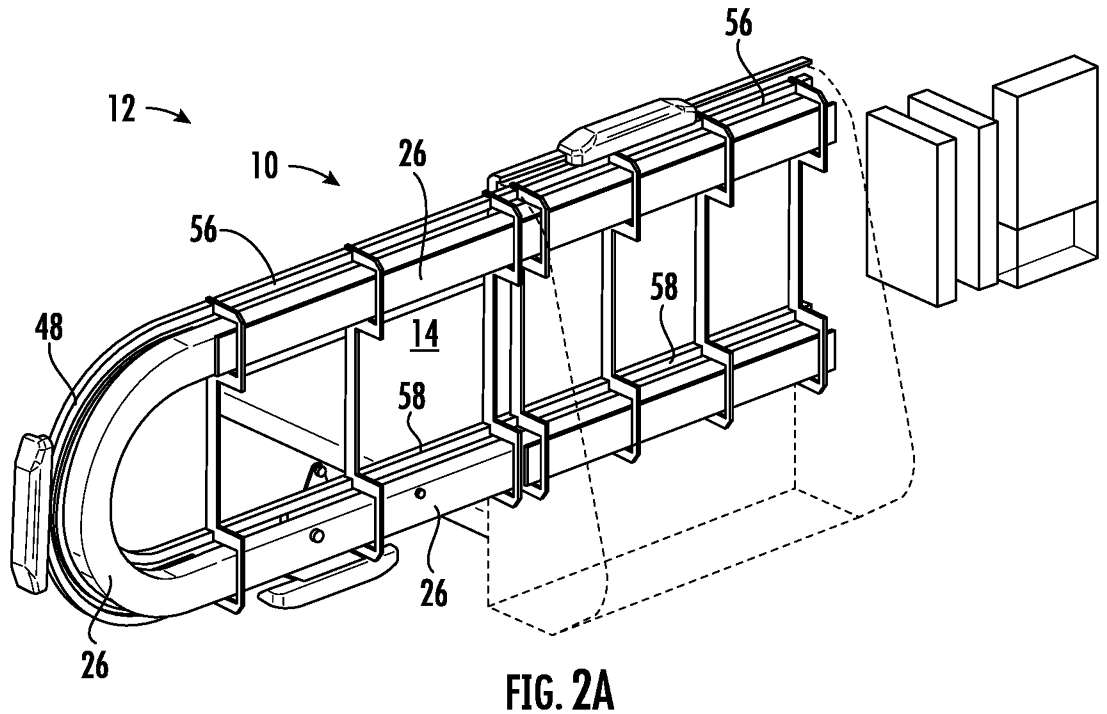
FIGS. 2A and 2B are perspective views of another embodiment of the handrail system constructed in accordance with the present disclosure.
Figure 2B:
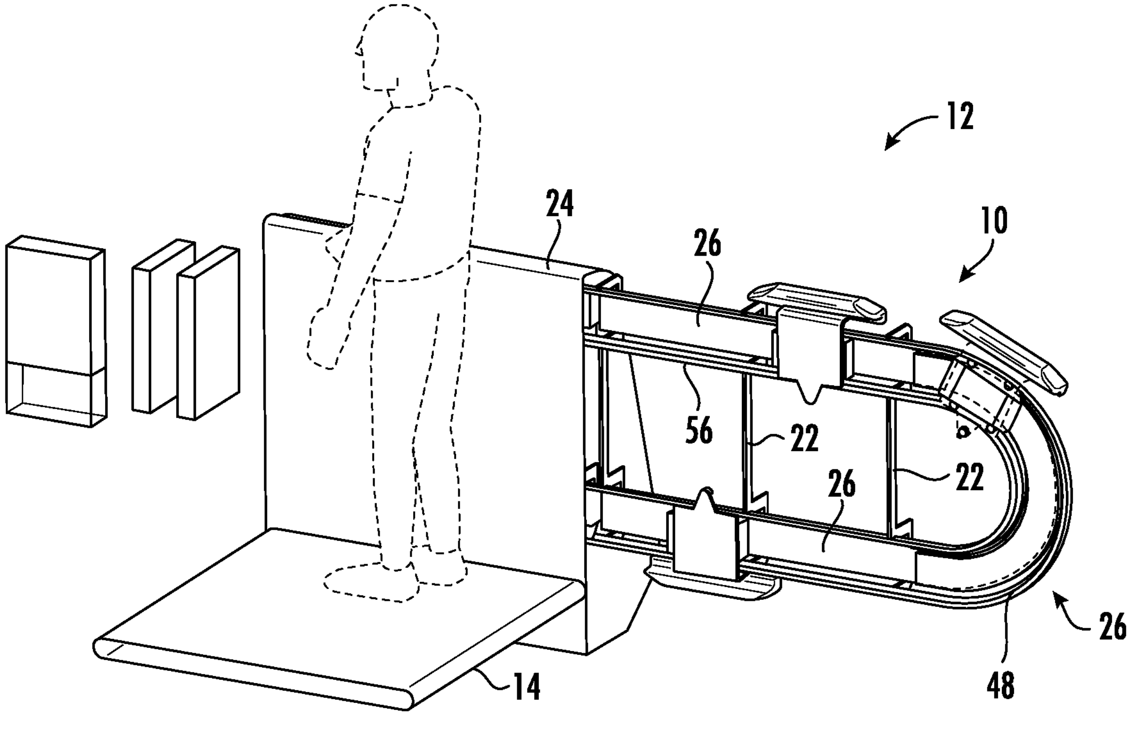
Figure 3A:
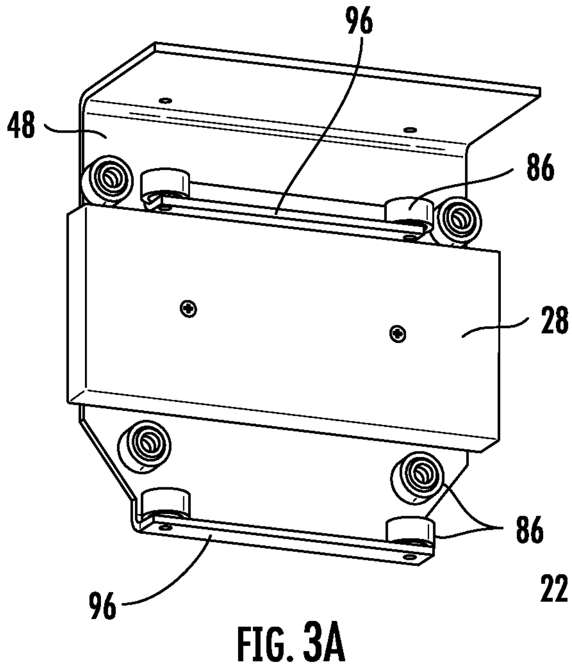
FIGS. 3A-3C are various views of certain aspects of one embodiment of the handrail system constructed in accordance with the present disclosure.
Figure 3B:
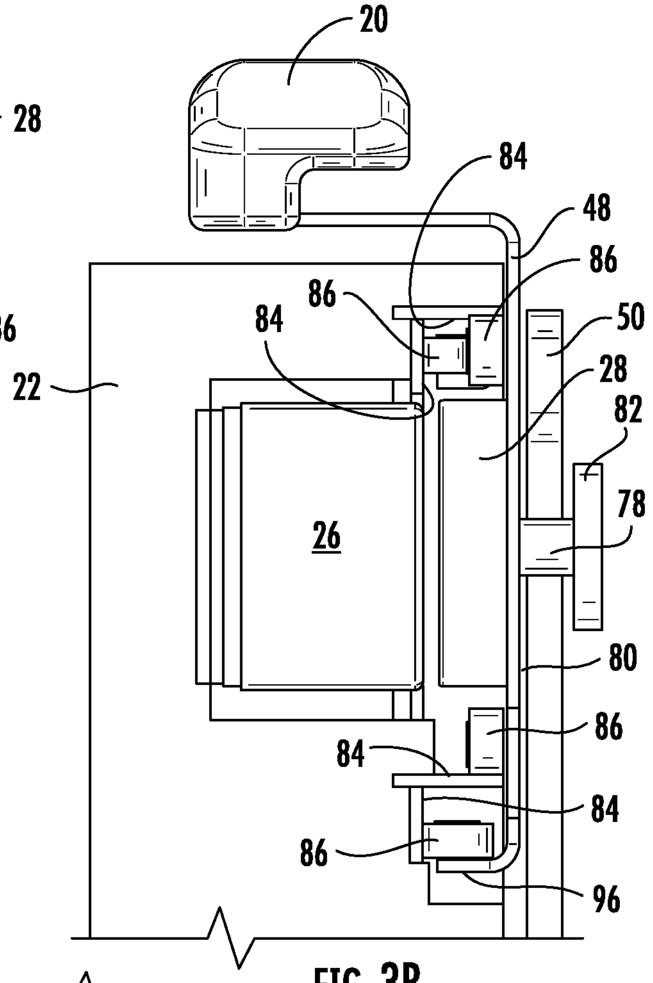
Figure 3C:
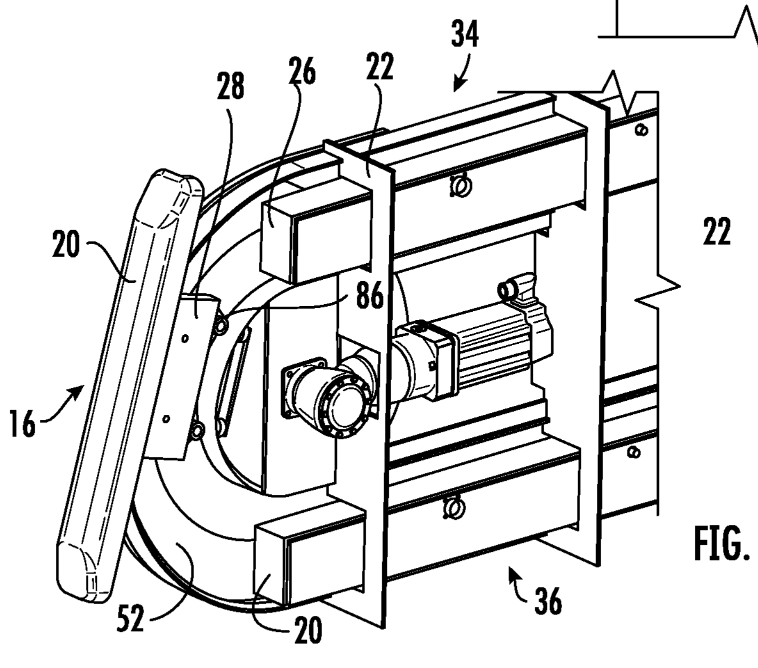
Figure 4A:
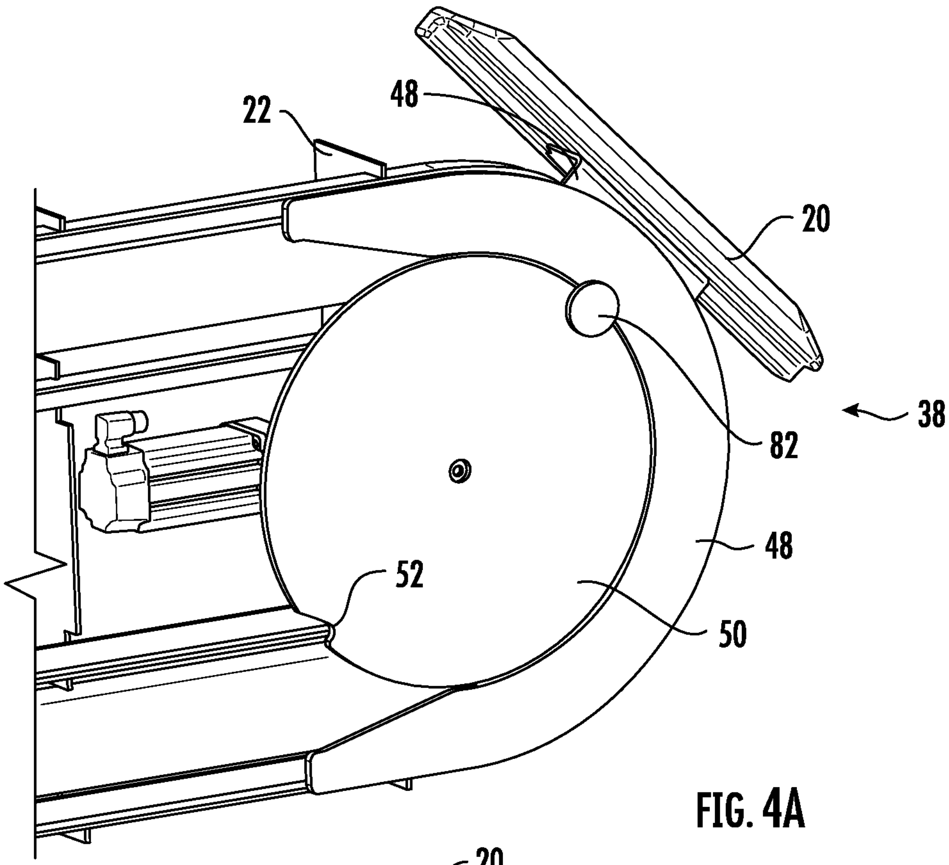
FIGS. 4A-4B are additional views of certain aspects of one embodiment of the handrail system constructed in accordance with the present disclosure.
Figure 4B:
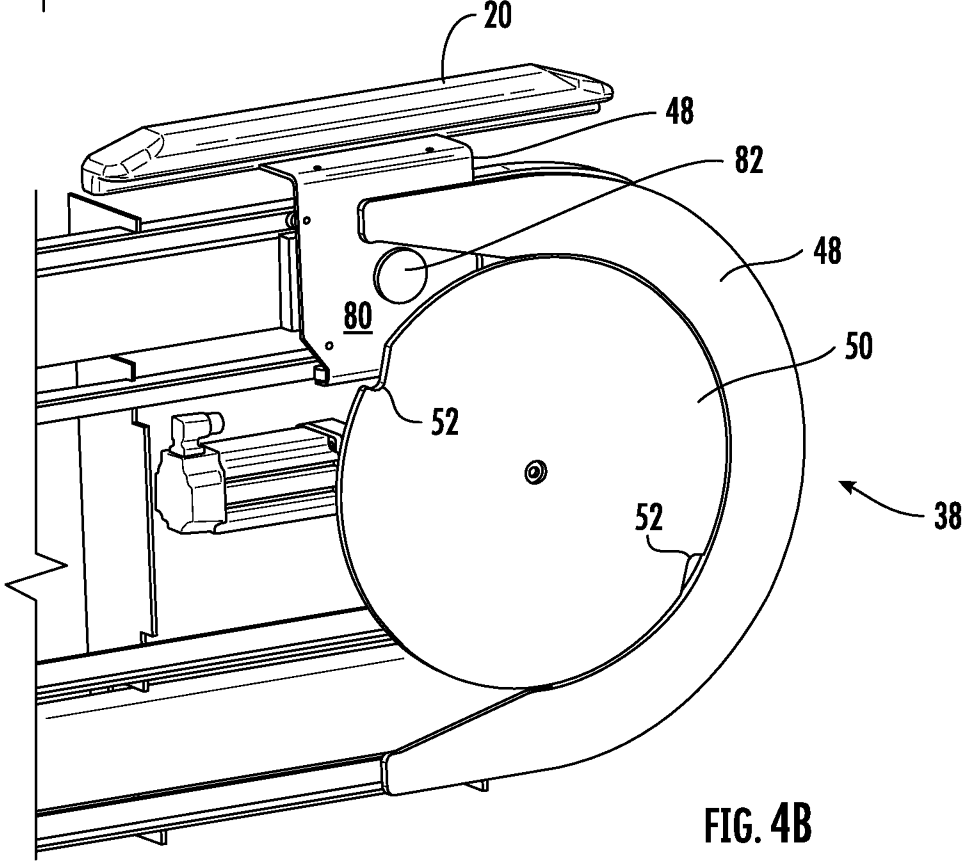

As shown in FIGS. 2A and 2B, the transition areas 38 can include a looping array of linear motors 26 to drive the handgrasp apparatuses 16 around a curved track 48 (supported by the frame 22) to continue the magnetic propulsion of the handgrasps 20 around the transition areas 38. In another embodiment shown in FIGS. 1A, 1B, and 3A-4B, the transition areas 38 can include a rotary wheel 50 that includes notches 52 therein to engage a protruded portion 54 of the base member 46 of the handgrasp apparatus 16. As the handgrasp apparatus 16, driven by a linear motor 26, approaches the transition area 38 from a linear passenger track 56 supported by the frame 22 associated with the passenger side 34 (or the transition area 38 from the return side 36), the protruded portion 54 of the base member 46 engages a notch 52 in the rotary wheel 50 and the rotary wheel 50 forces the handgrasp apparatus 16 along the curved track 48 and into engagement with a linear return track 58 associated with the return 36 (or the passenger track if transitioning from the return side 36 to the passenger side 34). The handgrasp apparatus 16 is propelled along the linear return track 58 by a linear motor(s) 26. In a further embodiment, the protruded portion 54 of the base member 46 can include a rotary element 60, such as a wheel, to more efficiently handle the rotational movement between the handgrasp apparatus 16 and the rotary wheel 50. The size of the rotary wheel 50 and the number of notches 52 in the rotary wheel 50 are determined by the radius of the curved track 48 of the transition areas 38, the number/frequency of handgrasp apparatuses 16 the particular handrail system 10 has. Furthermore, the rotational speed of the rotary wheel 50 can be synchronized with the speed the handgrasps 20 are propelled by the adjacent linear motors 26 (passenger linear motor and return linear motors). The rotary wheels 50 of the transition areas 38 can be controlled by the control system 32 that operates and controls the linear motors 26.

Figure 5:
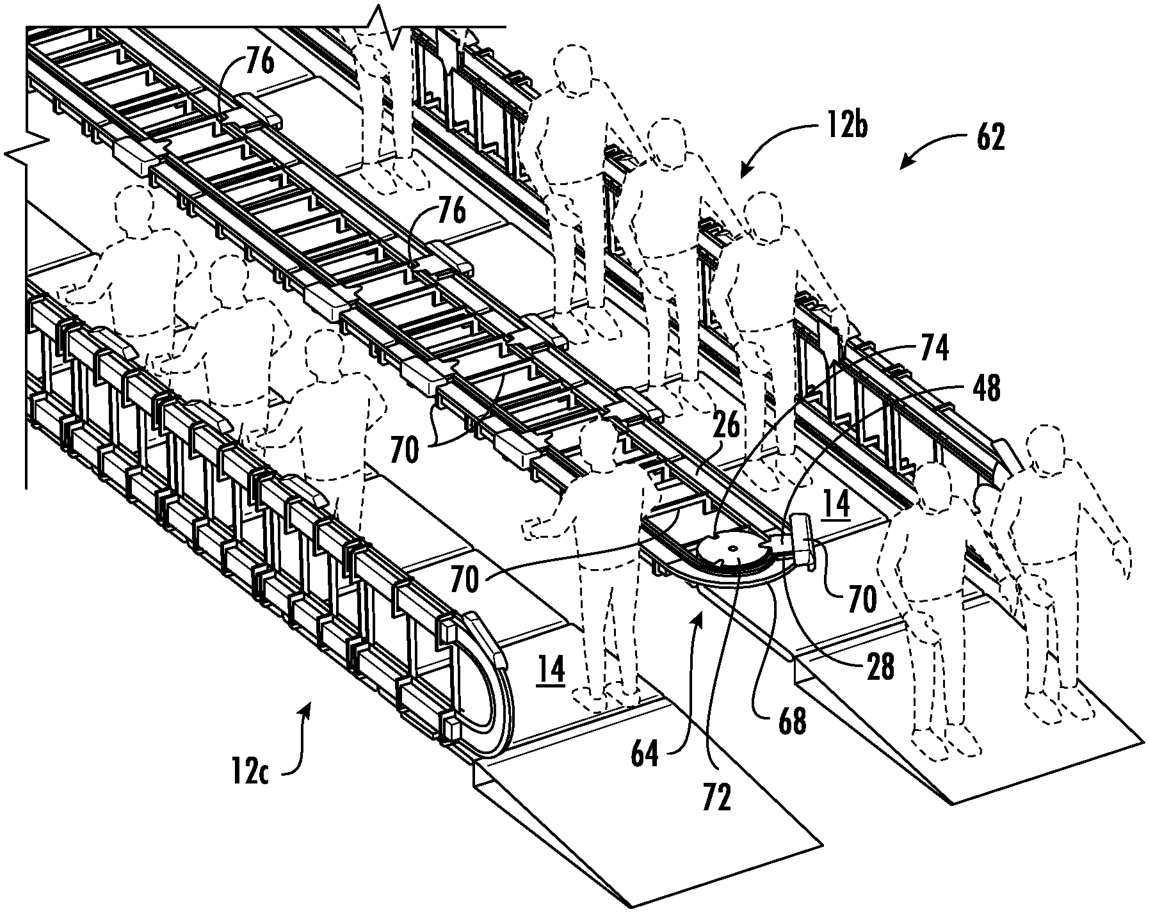
FIG. 5 is a perspective view of another embodiment of a handrail system constructed in accordance with the present disclosure.
Figure 6A:
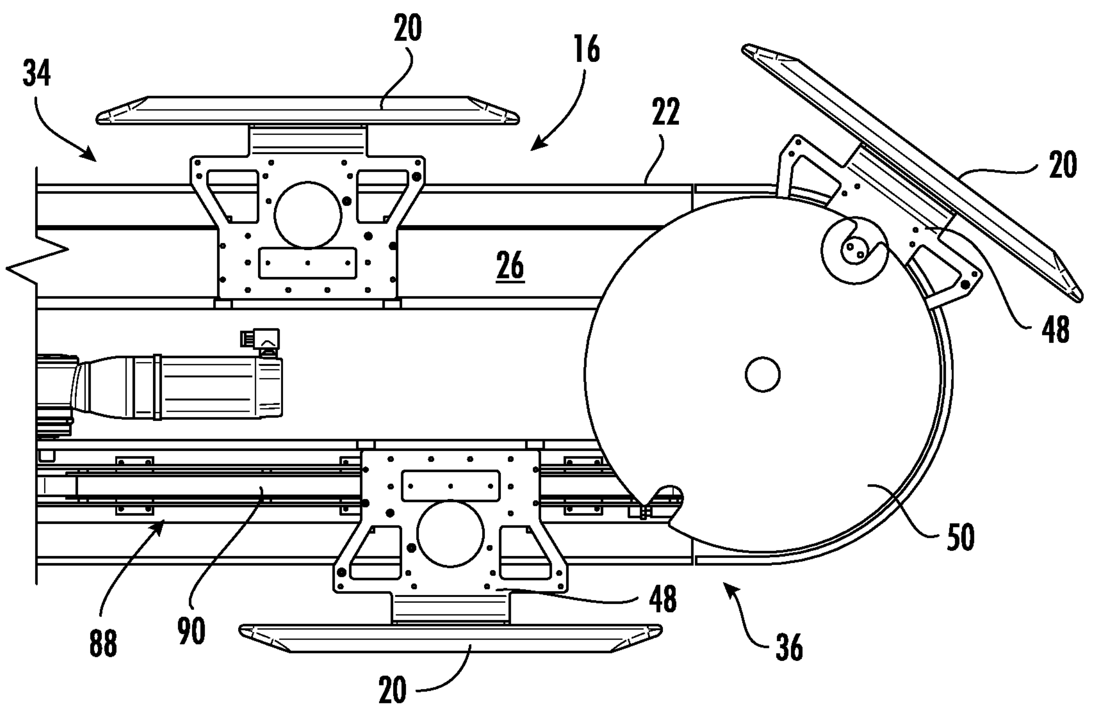
FIGS. 6A-6E provide multiple views of yet another embodiment of a handrail system constructed in accordance with the present disclosure.
Figure 6B:
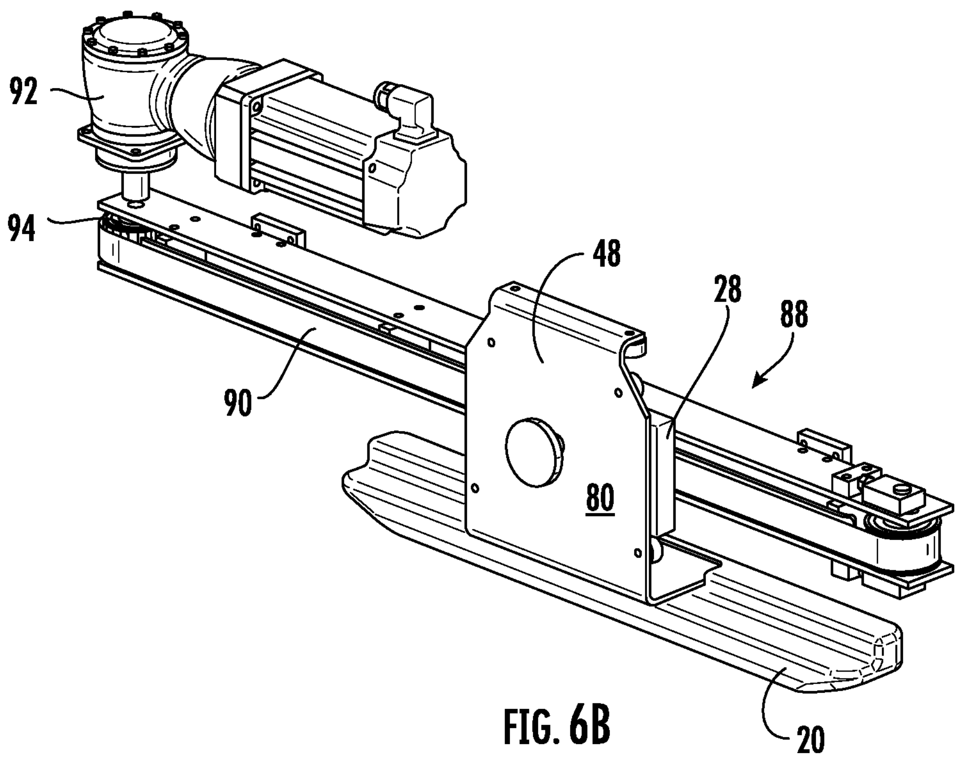
Figure 6C:
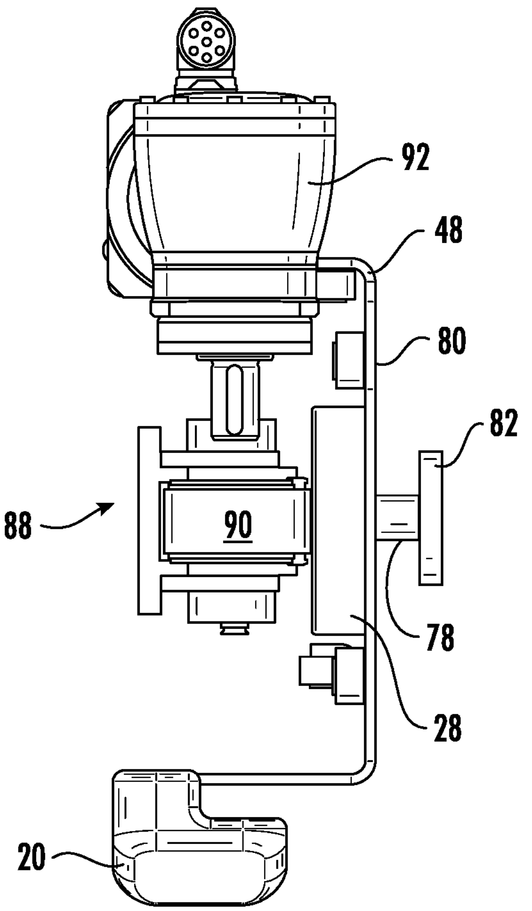
Figure 6D:
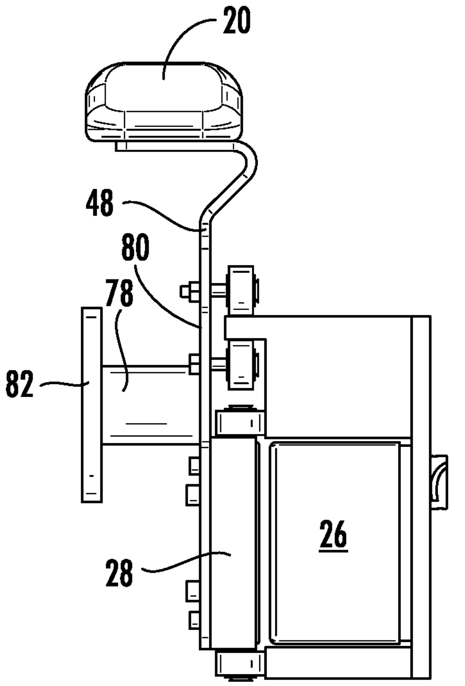
Figure 6E:
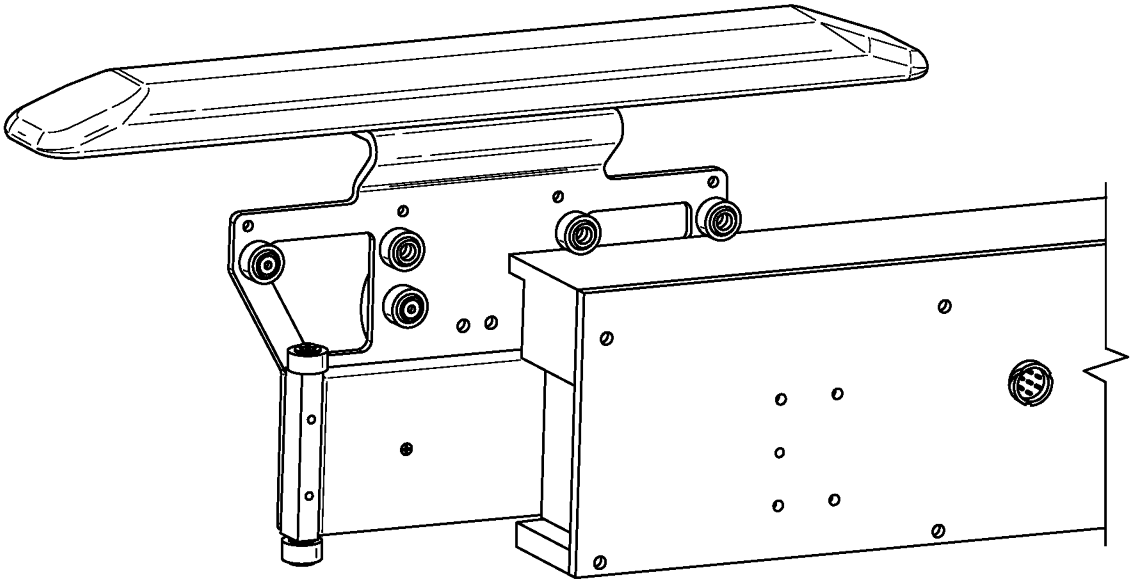
Figure 7A:
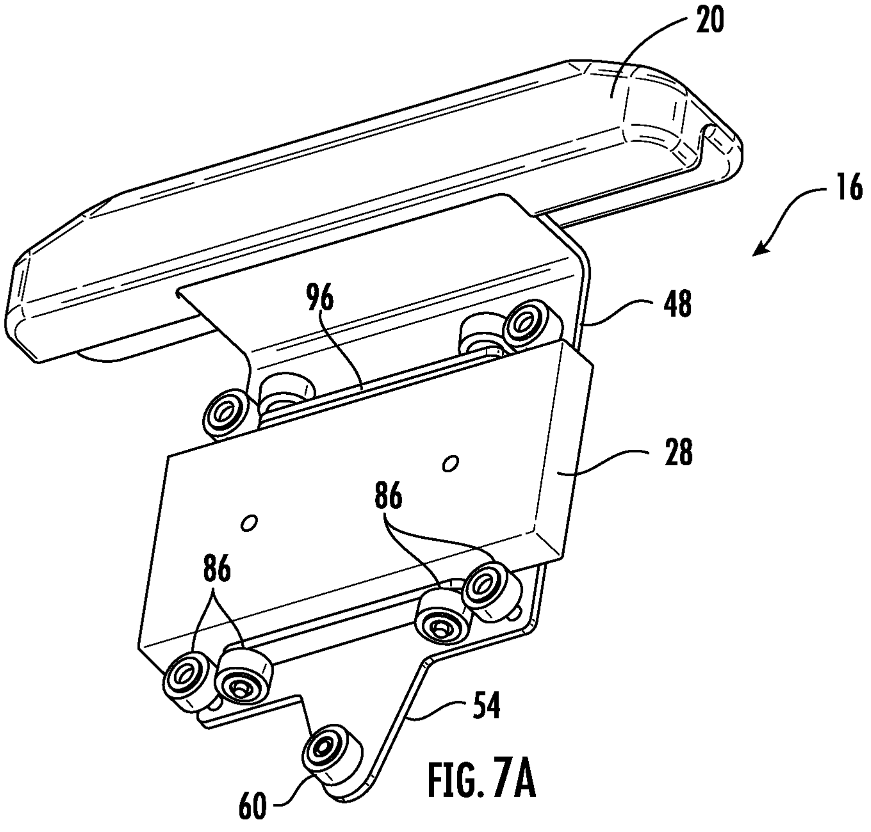
FIGS. 7A-7C are various views of certain aspects of one embodiment of the handrail system constructed in accordance with the present disclosure.
Figure 7B:
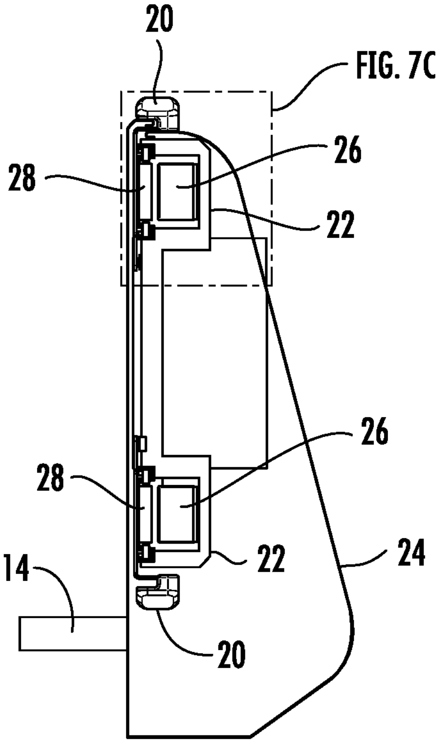
Figure 7C:
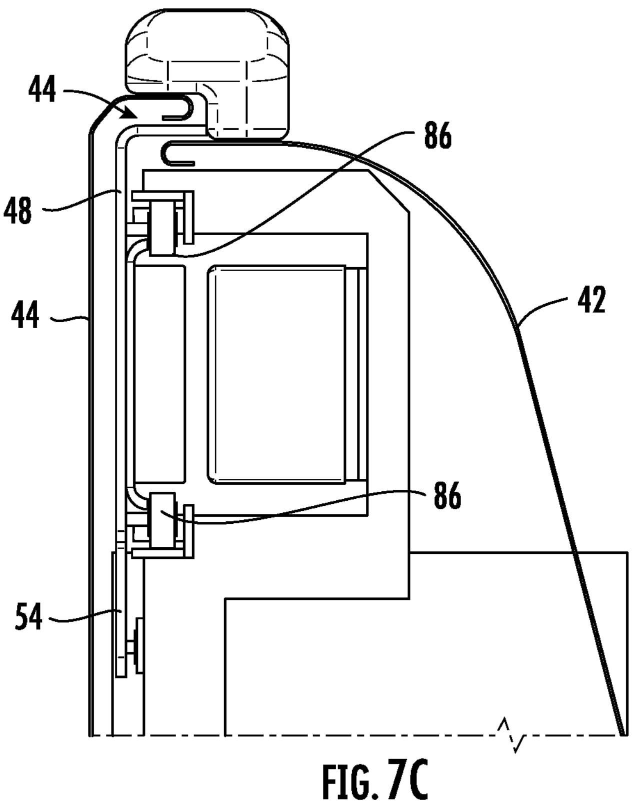

In one embodiment shown in FIG. 5, the handrail system 10 for the moving walkway 12 can be set up wherein each handgrasp apparatus 16 travels in a horizontal loop 62 that is parallel to the ground. In this embodiment, the handrail system 10 can provide handgrasps 20 to passengers for a first moving walkway 12*b* traveling in a particular direction on one side of the loop 62 the handrail system 10 travels on and can provide handgrasps 20 to passengers for a second moving walkway 12*c* traveling in the opposite direction of the first moving walkway 12*b* on the other side of the loop 62 the handrail system 10 travels on. The horizontal loop handrail system 62 can also include transition zones 64 like those described herein for a vertical loop handrail system. The transition zones 64 of the horizontal loop handrail system 62 occur where the handgrasps 20 transition from traveling a first direction to traveling a second direction and where the handgrasps 20 transition from traveling the second direction back to the first direction. This transition area 64 could be covered or uncovered. Similar to that described herein for the vertical loop system, the transition areas 64 of the horizontal loop handrail system 62 can include a looping array 66 of linear motors 26 around a curved track 68 (supported by a frame 70) to continue the magnetic propulsion of the handgrasps 20 around the transition areas 64. Similarly, the transition areas 64 for the horizontal loop handrail system 62 can include a horizontally disposed rotary wheel 72 that includes notches 74 therein to engage a protruded portion 76 of the handrail apparatus 16. In this embodiment, the horizontal rotary wheel 72 can operate in substantially the same way as the vertically disposed rotary wheel 50 to deliver the handgrasp apparatus 16 from the first direction of travel for the first moving walkway 12*b* to the second direction of travel for the second moving walkway 12*c*. A second rotary wheel/transition area 72/64 can cause the handgrasp apparatus 16 to go from the second direction of travel on the second moving walkway 12*c* back to the first direction of travel of the first moving walkway 12*b*. The rotary wheels 72 described herein, whether it be for the vertical or horizontal loop system, can have as many notches 74 as desirable to accomplish the desired transition function. The notches 74 can be shaped to accommodate clockwise or counterclockwise rotation. This would permit the handrail systems 10 to operate bidirectionally. The notches 74 could be shaped such that each notch 74 can accommodate bidirectional movement of the handrail system 10. The wheel 72 could be completely toothed (geared) for engagement with the handgrasp apparatuses 16.

In another embodiment shown in FIGS. 3A-4B, and 6A-6E, instead of a protruded portion 54, the base member 46 can have a post 78 extending from a backside 80 of the base member 46 that engages a notch 52 disposed in the rotary wheel 50. The post 78 can have a flange 82 attached to provide a space (i.e., between the base member 46 and the flange 82) where the rotary wheel 50 can consistently guide the notch 52 in the rotary wheel 50 to engage the post 78 and drive the handgrasp apparatus 16 around the transition area 38.

The frame 22 of the handrail system 10 can be supported inside the side housing 24 in any manner known in the art and can be supported by the outer side 42 or the inner side 40 of the side housing 24. The frame 22 is designed for the linear motors 26 of the handrail system 10 to be mounted in a position such that the permanent magnet 28 of the handgrasp apparatus 16 is positioned adjacent thereto to provide the propulsion of the handgrasp apparatus 16. The frame 22 also provides the linear return track 58 and the linear passenger track 56 that guides the handgrasp apparatuses 16. Each of the linear return track 58 and the linear passenger track 56 can be defined by multiple shoulders 84 that can engage with wheels 86 supported by the base member 46 of the handgrasp apparatus 16. The wheels 86 engage the shoulders 84 and prevent the handgrasp apparatus 16 from moving upward, downwards or towards the linear motors 26. The wheels 86 of the handgrasp apparatus 16 can also engage the curved track 48 of the transition areas 38.

In another embodiment of the present disclosure shown in FIGS. 6A-6E, the handgrasps 20 can be propelled along the return side 36 via a belt conveyor 88. The belt conveyors 8 in this embodiment can be a flat or grooved belt 90 that frictionally or magnetically engages a part or parts of the handgrasp apparatuses 16 to move the handgrasp apparatuses 16 along the return side 36. In one embodiment, the belt conveyor 88 can engage the magnet 28 (or magnet array) of the handgrasp apparatus 16. The belt conveyors 88 can also be metal belts that magnetically engage and propel the magnets 28 comprised in the handgrasp apparatus 16. The belt conveyor 88 can be propelled by a motor 92 used to turn a gear 94 the belt conveyor 88 is engaged with.

The handgrasp apparatuses 16 can have multiple embodiments as shown in FIGS. 3A-3C, 6A-6E, 7A-7C, and 8A-8B. In one embodiment, the handgrasp apparatus 16 can also include flange members 96 that extend from the base member 46 (or they can extend from a slat member attached to the base member 46) to support the wheels 86 that prevent movement of the base member 46, and a permanent magnet 28 attached thereto, from moving towards the linear motor 26. The base member 46 can also have the handgrasp 20 attached thereto. The handgrasp 20 is attached to the portion of the base member 46 that is extended out of the slot 44 between the inner part 40 and outer part 42 of the side housing 24. The handgrasp 20 can have any desirable shape such that it can be attached to the base member 46.

Figure 8A:
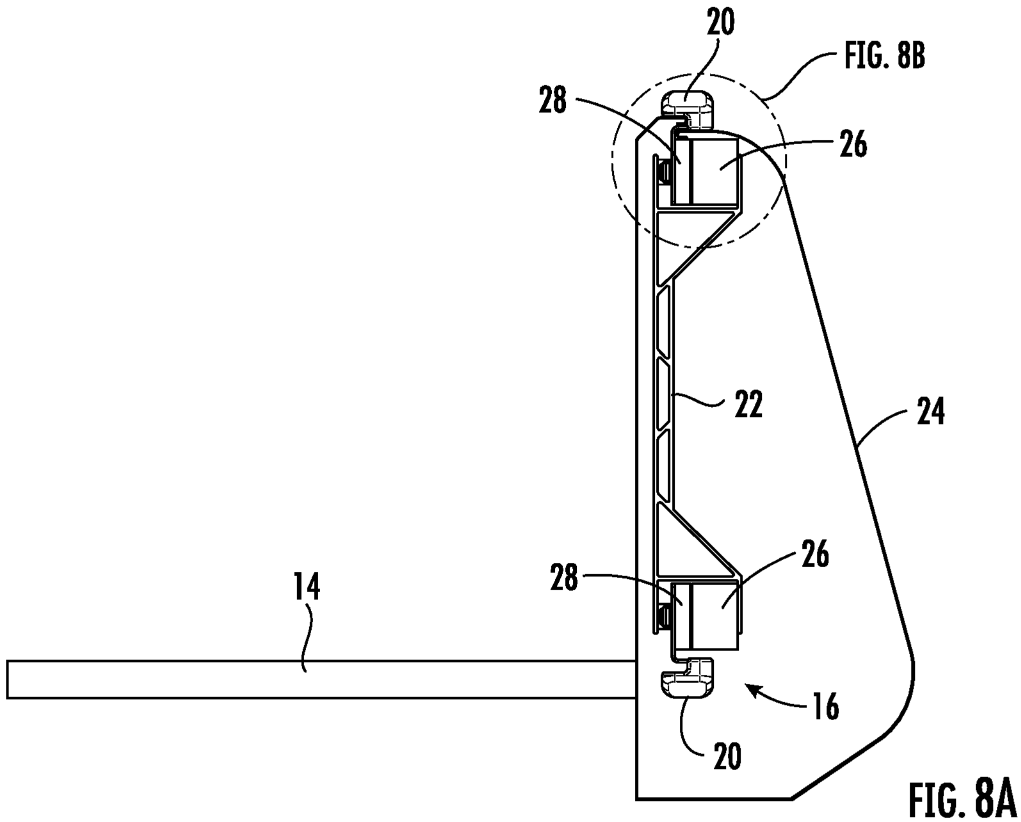
FIGS. 8A and 8B are various views of certain aspects of another embodiment of the handrail system constructed in accordance with the present disclosure.
Figure 8B:
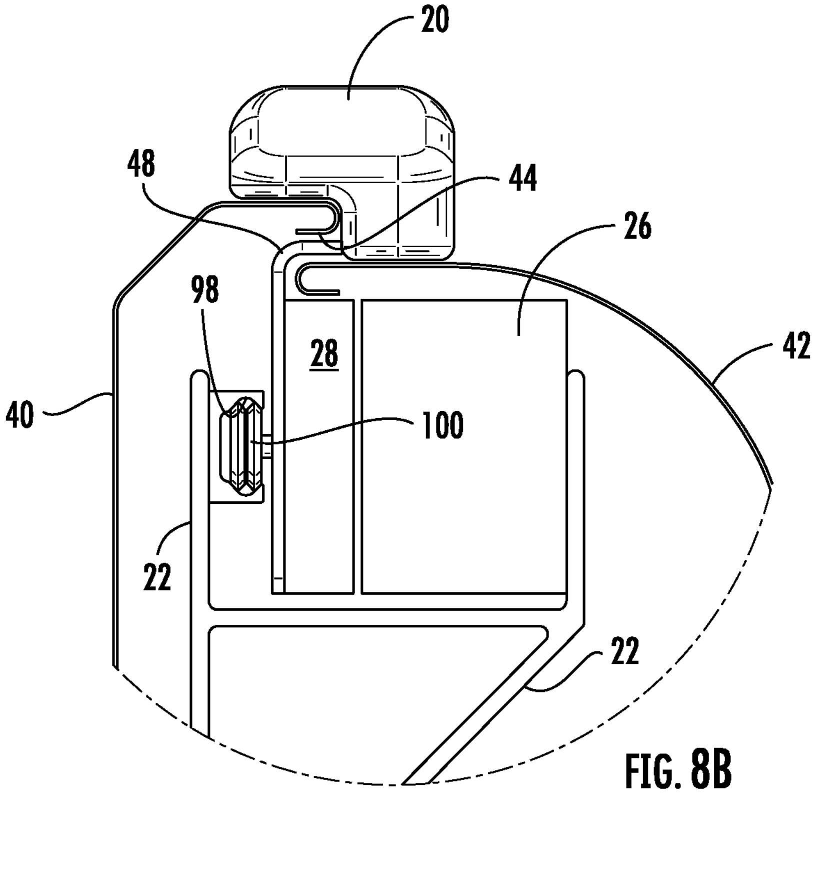

In another embodiment of the present disclosure shown in more detail in FIGS. 8A and 8B, the frame 22 can include a guide channel 98 attached thereto that can receive a wheel member 100 rotatably attached to the base element 46 of the handgrasp apparatus 16. In this embodiment the wheel member 100 can ride inside the guide channel 98, which prevents the handgrasp apparatus 16 from moving upward or downward relative to the frame 22 or the linear motors 26. The guide channel 98 also prohibits the base element 46 or permanent magnet 28 of the handgrasp apparatus 16 from moving towards the linear motors 26.

Figure 9:
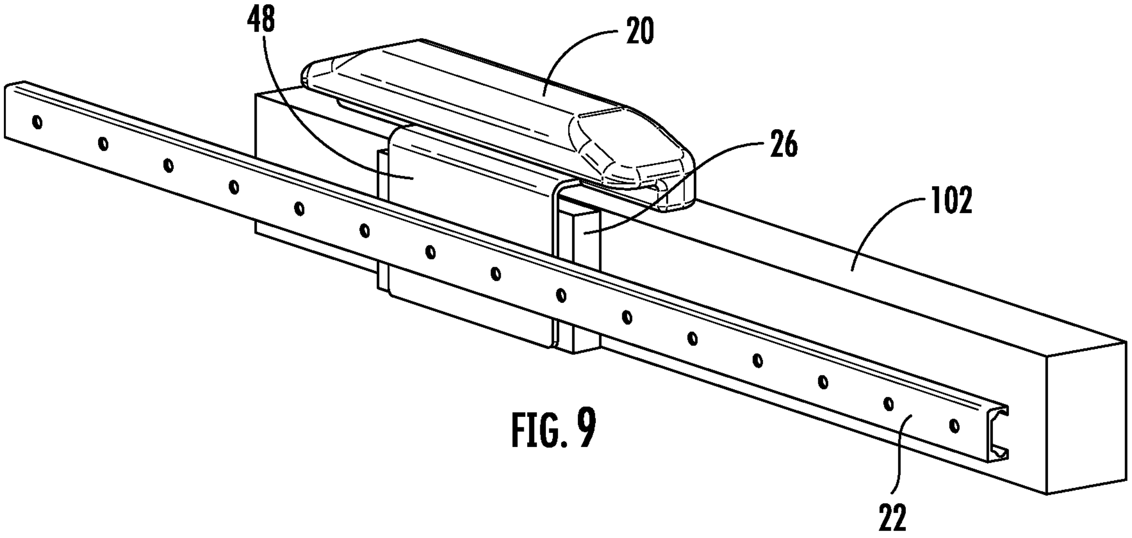
FIG. 9 is a perspective view of another embodiment of the handrail system constructed in accordance with the present disclosure.
Figure 10A:
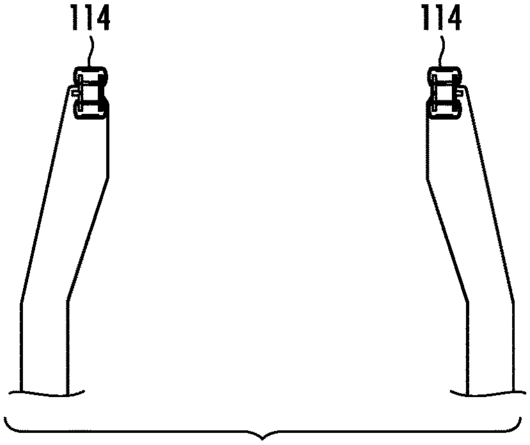
FIGS. 10A-10F show various views of another embodiment of the handrail system constructed in accordance with the present disclosure.
Figure 10B:
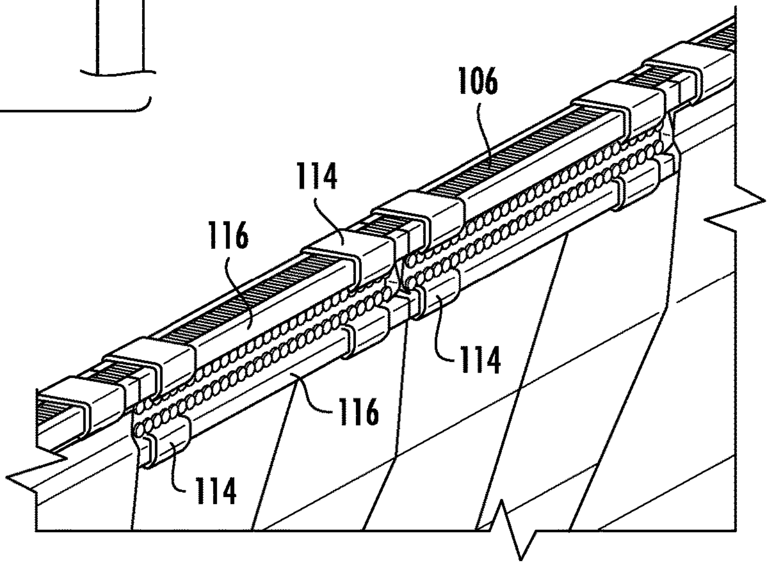
Figure 10C:
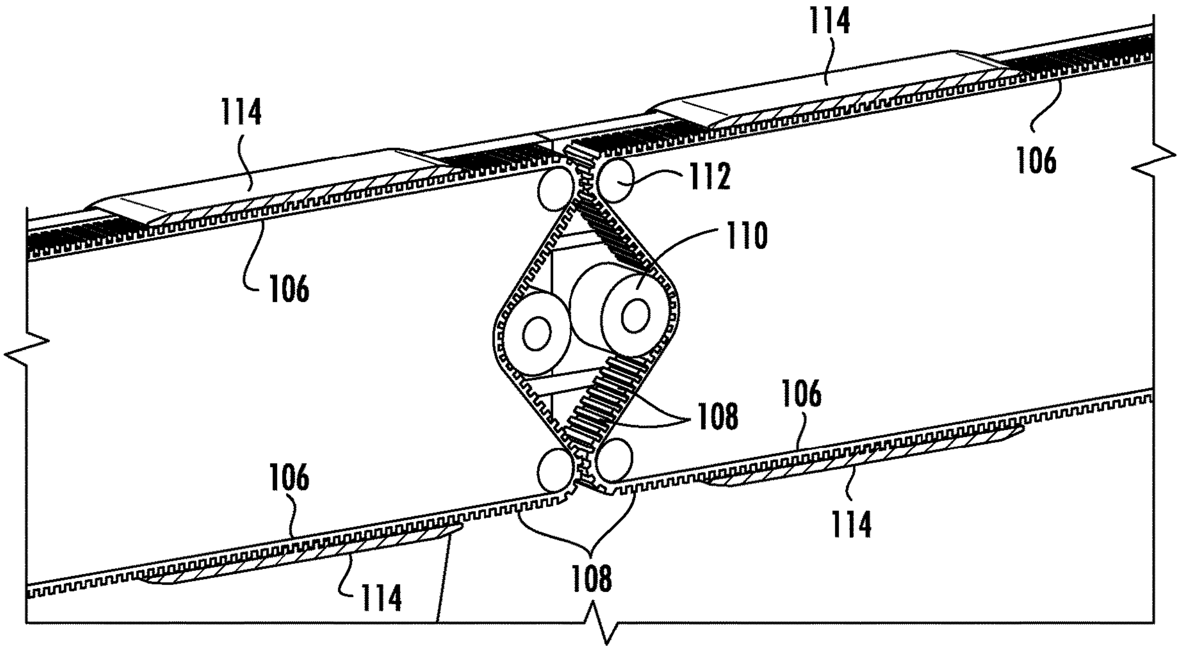
Figure 10D:
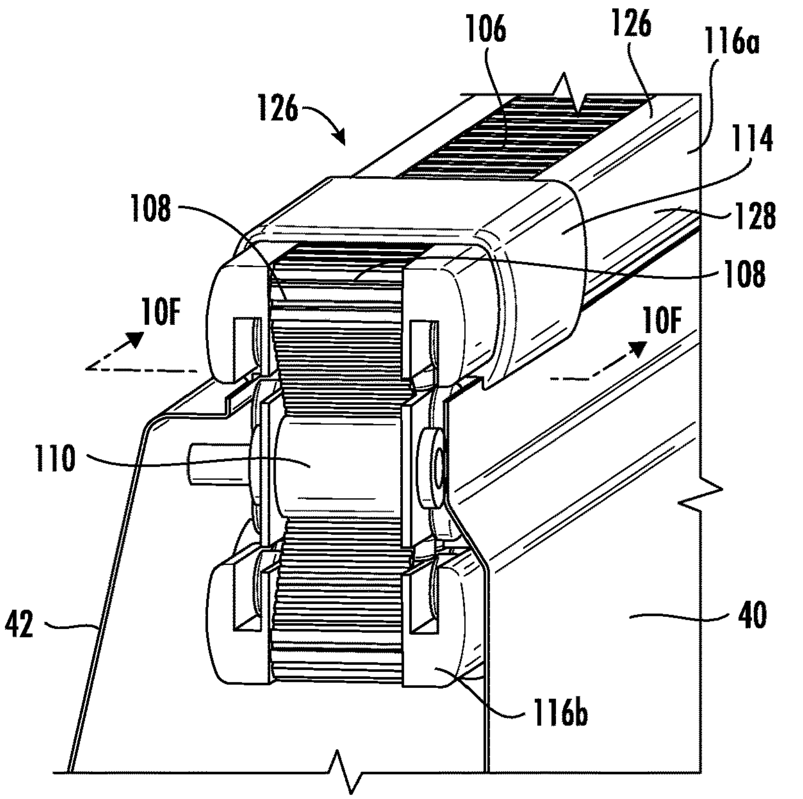
Figure 10E:
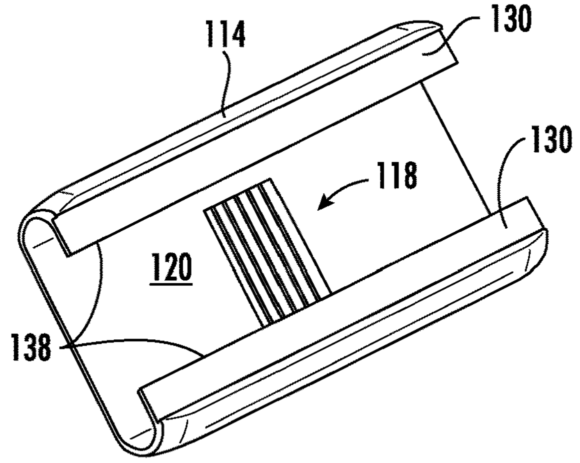
Figure 10F:
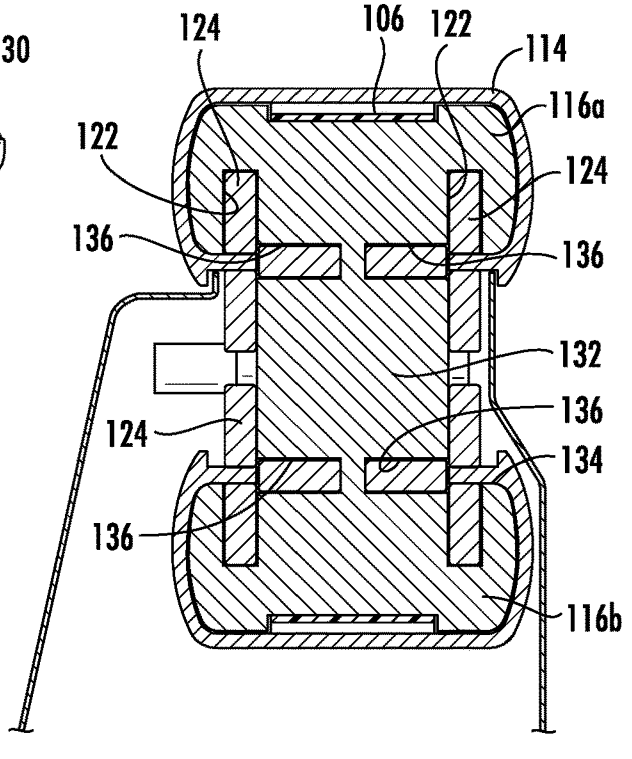

The propulsion of the handgrasps 20 has been described as being accomplished with a permanent magnet attached to the handgrasp apparatus 16 and positioned adjacent to a linear motor. In another embodiment shown in FIG. 9, the magnetic propulsion could be accomplished using aluminum extrusion or other magnetically propelled material. In yet another embodiment, the magnetic propulsion of the handgrasps 20 can be accomplished by using a linear motor 26 attached to the handgrasp apparatuses 16 and using a permanent magnet guide 102, aluminum extrusion, or other magnetically propelled material that is stationary and supported by the frame 22 of the handrail system 10.

In an even further embodiment of the present disclosure, the control system 32 of the handrail system 10 can include a synchronization system 104 that can coordinate the position of each handgrasp 20 relative to a particular passenger so that a particular handgrasp 20 will stay positioned adjacent to the particular passenger as they ride the moving walkway 12. For example, the synchronization system 104 can speed up or slow down the handgrasp 20 to position the handgrasp 20 in the desired position relative to the passenger as the passenger is sped up or slowed down by the moving walkway 12. The synchronization system 104 can be controlled by the control system 32 of the handrail system 10. It should be understood and appreciated that the control system 32 can also control all aspects of the moving walkways 12 the handrail systems 10 are incorporated into. The synchronization system 104 can include various sensors, or a computer vision camera system, that can determine the position, speed, acceleration, and/or displacement, or confirm the position, of a passenger on the moving walkway 12 and relay this information to the control system 32. The sensors can be any type of sensor such that the position of the passengers on the moving walkway 12 can be determined and sent to the control system 32. Examples of sensors include, but are not limited to, photo-electric, thermal, and the like. The control system 32 can use the information from the sensors to cause the linear motors 26 to move the handgrasps 20 to a desired position relative to the position of the passenger. The control system 32 can track the speed, position, acceleration, etc. of the handgrasps 20. In yet another embodiment, the handrail system 10 can include a linear motor driven handgrasp with a modular handrail belt underneath. The handrail belts could be flat. The handrail belt surface could either be smooth, or combed to fit with the handgrasps. The handrail belts would not drive the handgrasps, but rather provide a moving surface that matches the speed of the adjacent treadway in areas where a handgrasp is not present. This would reduce concerns around passengers coming in contact with an exposed, non-moving balustrade between the discrete handgrasps.

The present disclosure is also directed to a belt driven handrail system 10*a* for use with modular moving walkways. In this embodiment shown in FIGS. 10A-10E, the handrail system 10*a* includes multiple handrail belts 106 with laterally directed ridges 108 (this creates teeth on the belt) wherein each handrail belt 106 can be used separately as endless belts with each module of the modular moving walkway 12*a*. This handrail system 10*a* is designed such that the handrail belt 106 is driven by a drive roller 110 in approximate synchrony with the speed of the moving base treadway 14 associated with the module of the moving walkway 12 (i.e., as the speed of each module of the moving walkway 12 increases or decreases, the speed of the handrail belt 106 increases or decreases too). The handrail belt 106 can move around a series of rollers 112. The drive roller 110 can be coupled to the main drive of the base treadway 14 or a separate drive for more control. Additional rollers 112 can be placed outside of the handrail belt 106 to engage the belt 106 and provide the desired tension of the handrail belt 106.

This belt-driven handrail system 10*a* described herein also includes handgrasps 114 and a guide track 116 that the handgrasps 114 can slide on as the lateral ridges 108 of the belt 106 engages teeth 118 or ridges on an underside 120 of the handgrasps 114 to propel the handgrasps 114 down the guide track 116. Each module of the moving walkway 12 can be positioned immediately adjacent to another module such that the teeth 118 on the underside 120 of the handgrasps 114 can engage two adjacent module's belts 106 at once. This dual engagement permits the handgrasps 114 to be passed from the lateral ridges 108 of one module's handrail belt 106 to the lateral ridges 108 of the adjacent module's handrail belt 106.

In one embodiment, the guide track 116 can include an upper guide 116*a* and a lower guide 116*b*. The upper guide 116*a* can have two recessed channels 122 with bearings 124 disposed on the underside thereof. The handgrasp 114 can be shaped to matingly engage with the top 126 and sides 128 of the upper guide 116*a*. The handgrasps 114 can include extension slats 130 on each side that extend laterally under the upper guide 116*a* and can engage the bearings 124 disposed in the recessed channels 122 on the underside of the upper track 116*a*. The guide track 116 can also include a body portion 132 that connects the upper and lower tracks 116*a* and 116*b*. The body portion 132 can include a series of bearings 124 disposed on each side thereof that engage the other side of the extension slats 130 of the handgrasps 114. The slats 130 of the handgrasps 114 movement between the sets of bearings 124 allows for smooth movement of the handgrasps 114 down the guide track 116. The handgrasps 114 are on the passenger side 34 of the handrail system 10*a* when the handgrasps 114 are moving along the upper track 116*a*.

In a further embodiment of the present disclosure, the lower track 116*b* of the guide track 116 can be a mirror image of the upper track 116*a* and connected to the body portion 132 of the guide track 116. The lower track 116*b* can have two recessed channels 122 disposed on an upper side 134 thereof and include a series of bearings 124 in each recessed channel 122. The bearings 124 in the recessed channels 122 of the lower track 116*b* can engage the slat elements 130 of the handgrasps 114 when the handgrasps 114 are moving along the lower track 116*b* on the return side 36 of the handrail system 10*a*. The body portion 132 of the guide track 116 can also include two additional sets of bearings 124 to engage the other side of the slat elements 130 of the handgrasps 114 from the bearings 124 in the guide channels 122 of the lower track 116*b* when the handgrasps 114 are on the return side 36 of the handrail system 10*a*. This handrail system 10*a* can also be designed such that the handgrasp 114 can include bearings supported by the handgrasp 114 that engage/roll on guides and/or tracks secured inside the handrail sidewall.

In yet another embodiment of the present disclosure, the body portion 132 of the guide track 116 can include laterally disposed recesses 136 with bearings 124 or rollers disposed therein to engage with ends 138 of the slat elements 130 to prevent lateral movement of the handgrasps 114 perpendicular to the direction the handrail belts 106 travel and encourage movement of the handgrasps 114 in the direction the handrail belts 106 do travel. Similar to the handrail system 10 described above, there is a handrail system 10*a* for each side of the moving walkway 14. Each moving walkway module has two side housings 24 and each side housing 24 has an inner part 40 and an outer part 42. The guide track 116 can be positioned in an open space between upper portions of the inner and outer parts 40 and 42 of the side housing 24.

Each handrail system 10*a* can include transition sections where the handgrasps travel from the passenger side 34 to the return side 36 or from the return side 36 to the passenger side 34. The transition sections of this embodiment, can be done in any manner known in the art. They could be accomplished with transition sections that use a belt and offer a significantly wider turning radius to permit the handgrasps 114 to make the transition between the passenger and return sides 34 and 36. The handgrasps 114 could also be flexible such that a tighter turning radius could be achieved for the transition zones. In another embodiment of the present disclosure, the belt 106 and the handgrasps 114 do not have any ridges or teeth and the handgrasps 114 are moved by friction between the handrail belt 106 and the handgrasps 114.

Figure 11A:
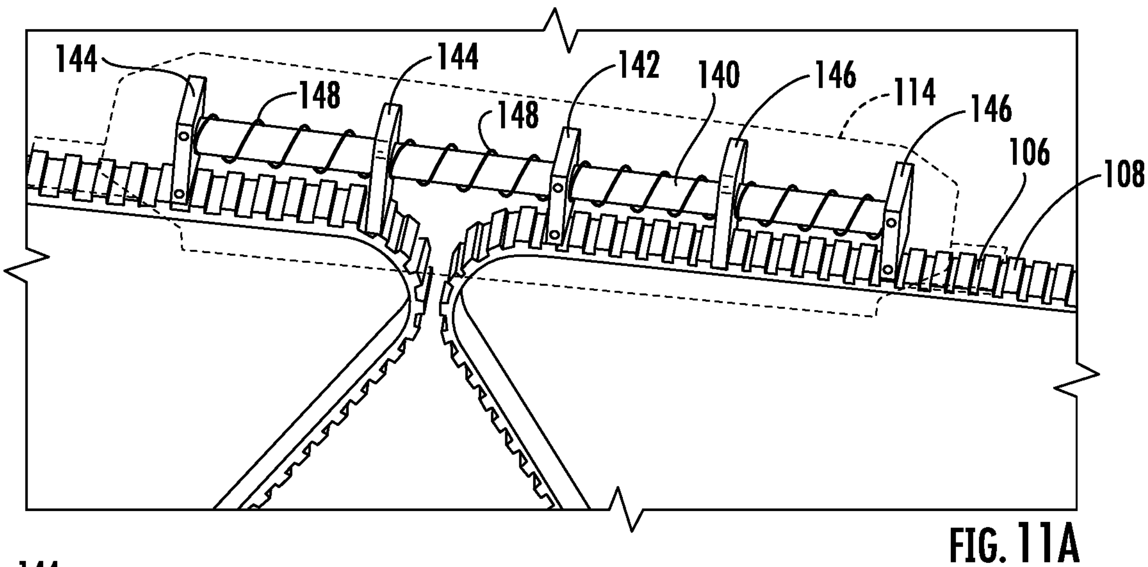
FIGS. 11A-11C show perspective views of another embodiment of the handrail system constructed in accordance with the present disclosure.
Figure 11B:
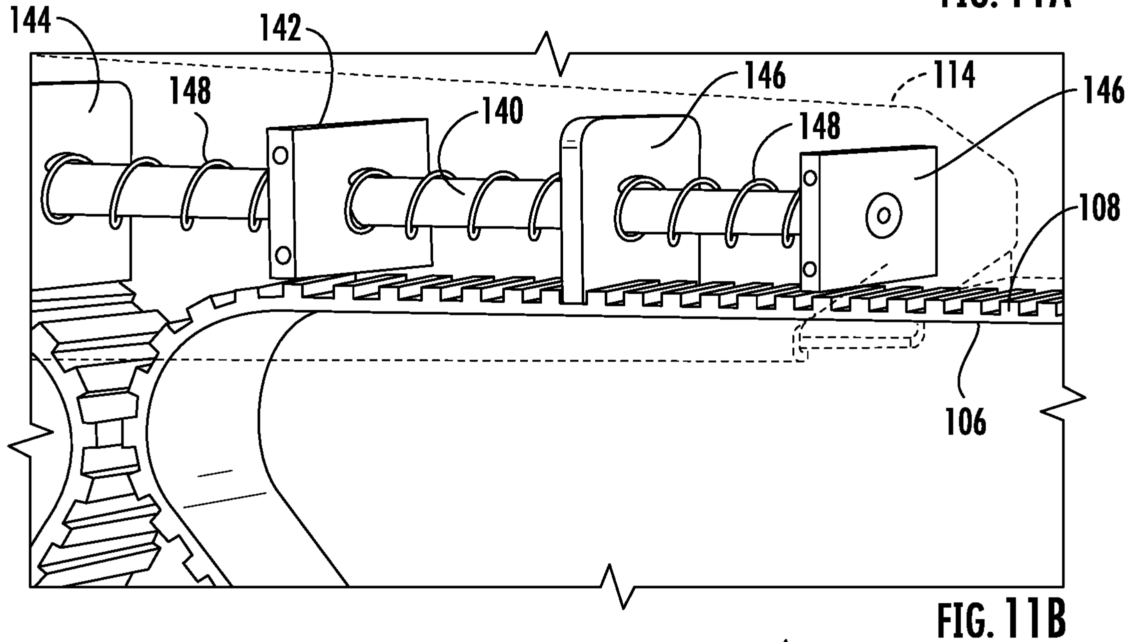
Figure 11C:
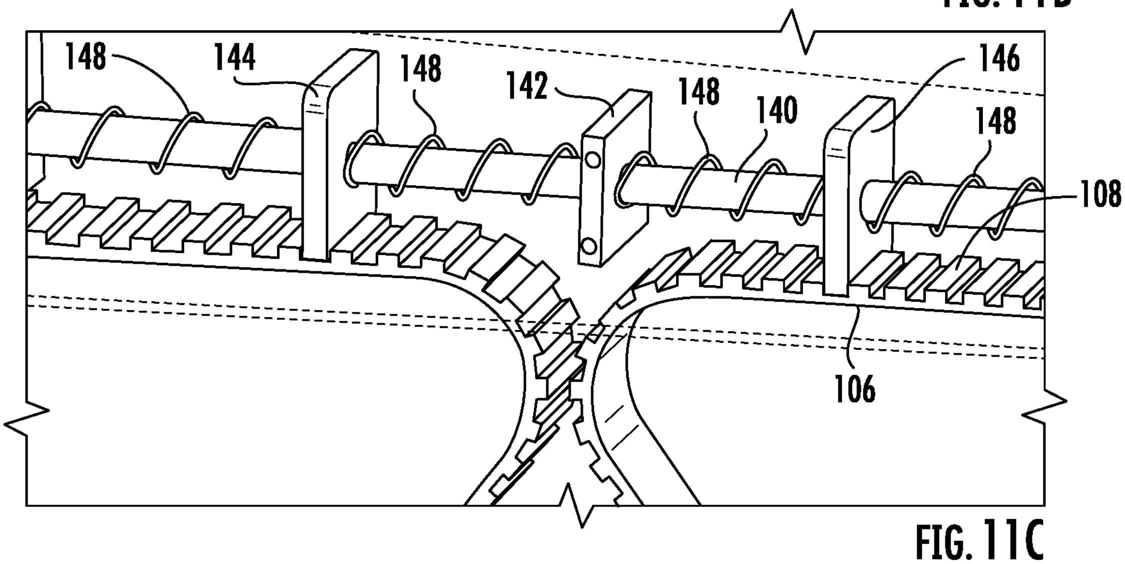

In yet another embodiment shown in FIGS. 11A-11C, when the handgrasps 114 are transitioning from one module at one speed to another module at a different speed, the underside of each handgrasp 114 could be designed with a central rod 140 horizontally disposed thereunder that includes a central plate 142 securely attached thereto. In addition to the central plate 142, the handgrasp 114 can include at least one forward plate 144 and at least one rearward plate 146 with springs 148 disposed between the plates 142, 144, and 146 and around the central rod 140. The forward and rearward plates 144 and 146 are slidably disposed on the central rod 140. The central plate 142 is sized such that it will not engage with the belts 106 of the adjacent walkway modules. The forward and rearward plates 144 and 146 are sized such that they will engage with the ridges 108 or teeth disposed on the belts 106 of the adjacent walkway modules. The springs 148 allow for movement of the forward and rearward plates 144 and 146 forward or backward relative to the central plate 142 when the handgrasps 114 transition from a first walkway module having a first belt 106 moving at a first speed and a second walkway module having a second belt 106 moving at a second speed. The first speed can be faster or slower than the second speed. Furthermore, the springs 148 also force the forward plates 144 and rearward plates 146 between two adjacent ridges 108 or teeth of a particular belt 106 when the plate 144 or 146 doesn't initially engage with a space between two adjacent ridges 108 or teeth.

Figure 12:
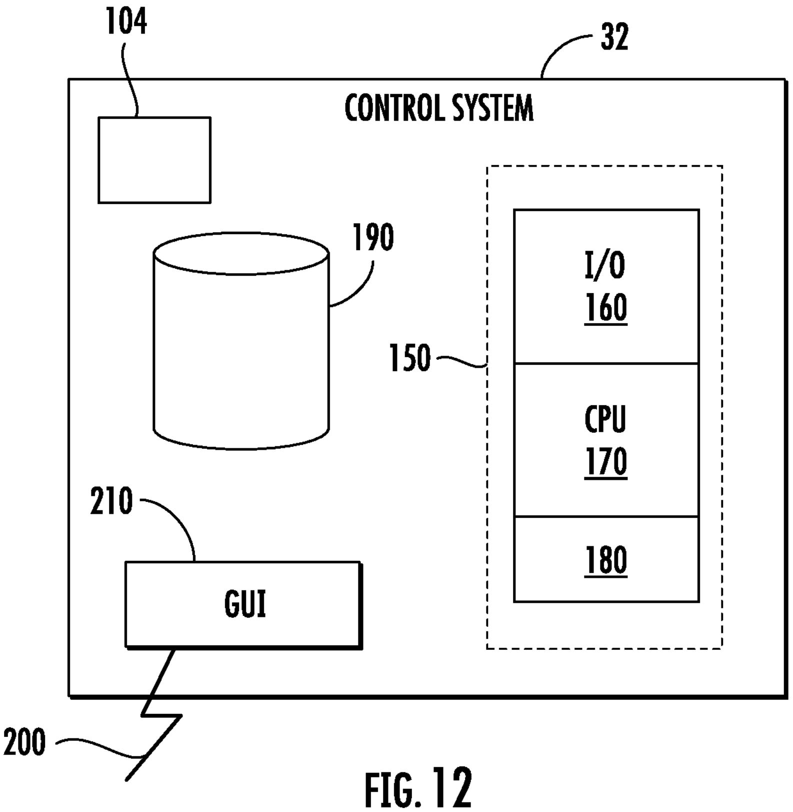
FIG. 12 is a schematic view of a control system for the handrail system constructed in accordance with the present disclosure.

Referring now to FIG. 12 shown therein is a diagram of the control system 32. The control system 32 is capable of executing a computer program product embodied in a tangible processor-readable storage medium to execute a computer process. Data and program files may be input into the control system 32, which reads the files and executes the programs therein using one or more processors. Some of the elements of the control system 32, in addition to the synchronization system 104, are shown in FIG. 12, wherein a processor 150 is shown having an input/output (I/O) section 160, a Central Processing Unit (CPU) 170, and a memory section 180. There may be one or more processors 150, such that the processor 150 of the control system 32 comprises a single central-processing unit 170, or a plurality of processing units. The processors may be single-core or multi-core processors. The control system 32 may be a conventional computer, a distributed computer, or any other type of computer. The described technology is optionally implemented in software loaded in memory 180, a disc storage unit 190, and/or communicated via a wired or wireless network link 200 on a carrier signal (e.g., Ethernet, 3G wireless, 1G wireless, LTE (Long Term Evolution), 5G)

thereby transforming the control system 32 in FIG. 12 to a special purpose machine for implementing the described operations.

The I/O section 160 may be connected to one or more user-interface devices (e.g., a keyboard, a touch-screen display unit, etc.) or a disc storage unit 190. Computer program products containing mechanisms to effectuate the systems and methods in accordance with the described technology may reside in the memory section 180 or on the storage unit 190 of the control system 32.

The control system 32 can also include a communication interface 210 capable of connecting the control system 32 to an enterprise network via the network link 200, through which the control system 32 can receive instructions and data embodied in a carrier wave. When used in a local area networking (LAN) environment, the control system 32 is connected (by wired connection or wirelessly) to a local network through the communication interface 210, which is one type of communications device. When used in a wide-area-networking (WAN) environment, the control system 32 typically includes a modem, a network adapter, or any other type of communications device for establishing communications over the wide-area network. In a networked environment, program modules depicted relative to the control system 32 or portions thereof may be stored in a remote memory storage device. It is appreciated that the network connections shown are examples of communications devices for and other means of establishing a communications link between the computers may be used.

In an example implementation, a browser application, a compatibility engine applying one or more compatibility criteria, and other modules or programs may be embodied by instructions stored in memory 180 and/or the storage unit 190 and executed by the processor 150. Further, local computing systems, remote data sources and/or services, and other associated logic represent firmware, hardware, and/or software, which may be configured to operate the handrail system 10, and the moving walkway 12 the handrail system 10 is implemented into. The control system 32 of the handrail system 10 may be implemented using a general purpose computer and specialized software (such as a server executing service software), a special purpose computing system and specialized software (such as a mobile device or network appliance executing service software), or other computing configurations. In addition, user requests, profiles and parameter data, agent profiles and parameter data, location data, parameter matching data, and other data may be stored in the memory 180 and/or the storage unit 190 and executed by the processor 150.

The embodiments of the invention described herein are implemented as logical steps in one or more computer systems. The logical operations of the present invention are implemented (1) as a sequence of processor-implemented steps executed in one or more computer systems and (2) as interconnected machine or circuit modules within one or more computer systems. The implementation is a matter of choice, dependent on the performance requirements of the computer system implementing the invention. Accordingly, the logical operations making up the implementations of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Data storage and/or memory may be embodied by various types of storage, such as hard disk media, a storage array containing multiple storage devices, optical media, solid-state drive technology, ROM, RAM, and other technology. The operations may be implemented in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term “memory” (e.g., memory 180) means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term “memory” or “storage medium” expressly does not include a transitory medium, such as a carrier signal, but the computer instructions can be transferred to the memory wirelessly.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A handrail system for a moving walkway, the handrail system comprising:
- multiple handgrasp apparatuses for the moving walkway, each handgrasp apparatus includes a handgrasp;
- a linear motor attached to each handgrasp apparatus that interacts with magnets that are supported by a frame to propel the handgrasp apparatuses around at least a portion of the loop track;
- a propulsion system for propelling the handgrasp apparatuses on a passenger side and a return side of a loop track the handgrasp apparatuses travel around; and
- a side housing for supporting the handrail system and enclosing the return side for the handgrasps.

2. The system of claim 1 wherein the propulsion system includes linear motors along the passenger side that interact with a magnet supported by each handgrasp apparatus to propel the handgrasp apparatuses around at least a portion of the loop track.

3. The system of claim 2 wherein the propulsion system further includes linear motors along the return side that interact with the magnet supported by each handgrasp apparatus to propel the handgrasp apparatuses around another portion of the loop track.

4. The system of claim 1 further comprising a frame that defines the loop track the handgrasp apparatuses will travel around.

5. The system of claim 1 wherein the loop track includes transition zones to allow the handgrasp apparatuses to move from the passenger side to the return side and from the return side to the passenger side.

6. The system of claim 5 wherein each transition zone includes a rotary wheel that interacts with a portion of each handgrasp apparatus to facilitate movement of the handgrasp apparatuses from the linearly disposed passenger side to the linearly disposed return side and from the linear disposed return side to the linearly disposed passenger side.

7. The system of claim 6 wherein the rotary wheel includes notches disposed therein that engage with a protruded portion that extends from a base member of each handgrasp apparatus.

8. The system of claim 5 wherein each transition zone includes a curved linear motor to propel the handgrasp apparatuses around the transition zone.

9. The system of claim 1 wherein the loop track is horizontally disposed and the passenger side of the loop track provides handgrasps to passengers going a first direction on a first moving walkway and the return side of the loop track provides handgrasps to passengers going a second direction on a second moving walkway.

10. The system of claim 1 wherein the moving walkway is a modular moving walkway wherein each module of the moving walkway includes a separate linear motor for each passenger side of the loop track.

11. The system of claim 1 wherein the propulsion system includes a conveyor belt that engages a part of each handgrasp apparatus to propel the handgrasp apparatus down the return side of the loop track.

12. The system of claim 2 further comprising a computer system to set motion profiles and modulate speed of the handgrasps by sending electrical signals to the linear motors of the propulsion system.

13. The system of claim 12 wherein the computer system includes a synchronization system that tracks and coordinates the position of the handgrasps of the handrail system relative to passengers riding the moving walkway.

14. The system of claim 4 wherein the frame has a series of shoulders that can be engaged by a series of wheels mounted to the handgrasp apparatus to maintain position of the handgrasp apparatuses as they travel around the loop track.

15. A handrail system for use with a moving walkway, the handrail system comprising:

a handrail belt;

a driver roller for moving the handrail belt; and multiple handgrasps driven around a loop track by the handrail belt, each handgrasp includes:

a central plate disposed on an underside of each handgrasp;

a central rod that extends forward from the central plate and rearward from the central plate;

a forward plate that engages with teeth disposed on the handrail belts of the modules; and a rearward plate that engages the teeth disposed on the handrail belts.

16. The system of claim 15 wherein the handrail belt includes ridges that engage teeth on an underside of the handgrasps to propel the handgrasps around the loop track.

17. The system of claim 16 further comprising a guide track positioned adjacent to the handrail belt that maintains position of the handgrasps on the loop track and cooperates with the handgrasps to maintain engagement between the handgrasps and the handrail belt.

18. The system of claim 17 wherein guide track includes a body with recesses disposed therein to receive bearings to facilitate movement of the handgrasps by the handrail belt.

19. The system of claim 15 wherein the moving walkway is a modular moving walkway and each module of the modular moving walkway has a separate handrail belt.

20. The system of claim 15 wherein the handgrasp further includes springs disposed around the central rod between the central plate and the forward plate and around the central rod between the central plate and the rearward plate, the springs move the forward and central plates to better engage the teeth on the handrail belts as the handgrasps transition from one handrail belt of one module to the handrail belt of an adjacent module.

* * * * *